United States Patent

Dewitt

[15] 3,636,384

[45] Jan. 18, 1972

[54] BASE-TO-EMITTER COMPENSATION FOR CURRENT SWITCH EMITTER-FOLLOWER CIRCUITS

[72] Inventor: David Dewitt, Poughkeepsie, N.Y.

[73] Assignee: International Business Machines Corporation, Armonk, N.Y.

[22] Filed: Sept. 14, 1970

[21] Appl. No.: 71,715

[52] U.S. Cl. .............................. 307/297, 307/215, 307/310, 330/23, 330/30 D

[51] Int. Cl. .............................. H03k 1/12

[58] Field of Search .............................. 307/215, 297, 310; 330/23, 330/69, 30 D

[56] References Cited

UNITED STATES PATENTS

| | | | |
|---|---|---|---|
| 3,443,202 | 5/1969 | Moulton | 307/297 |
| 3,259,761 | 7/1966 | Narud | 307/297 |
| 3,522,446 | 8/1970 | Kodama | 307/215 |

OTHER PUBLICATIONS

M. P. Xylander, IBM Tech. Disclosure Bull., Single Voltage Supply, High-Performance Logic Circuit," Vol. 11, No. 9, Feb. 1969

*Primary Examiner*—Donald D. Forrer
*Assistant Examiner*—David M. Carter
*Attorney*—Hanifin and Jancin and Martin G. Reiffin

[57] ABSTRACT

A current-switch emitter-follower is provided with a circuit which compensates for the variations in base-to-emitter voltage due to variations in temperature. The circuit comprises a regulated power supply which maintains its output at a predetermined level with respect to a reference potential such as ground. The power supply includes a transistor having its emitter at said reference potential. The base of this transistor is connected to the power supply output terminal which is therefore maintained at a predetermined level, the base-to-emitter voltage, with respect to said ground reference potential. The base-to-emitter voltage of this transistor tracks the base-to-emitter voltage of the emitter-follower circuits so as to compensate for the variations in the latter.

13 Claims, 1 Drawing Figure

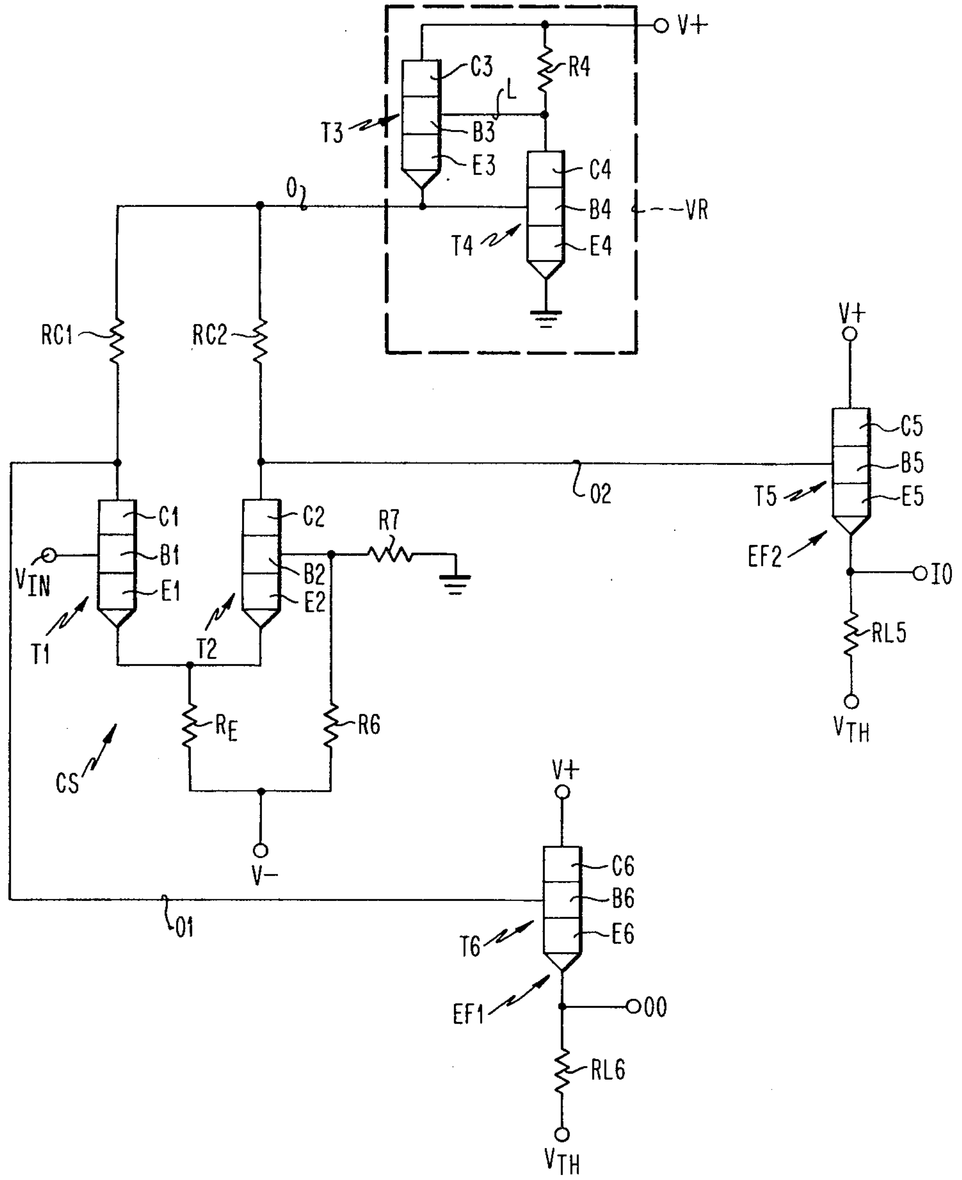
INVENTOR
DAVID DeWITT
BY Martin G. Reiffin
ATTORNEY

BASE-TO-EMITTER COMPENSATION FOR CURRENT SWITCH EMITTER-FOLLOWER CIRCUITS

FIELD OF THE INVENTION

The present invention relates to current-switch emitter-follower circuits utilized in the faster digital computers. The current-switch circuit comprises a pair of transistors having their emitters connected to a current source so that the current flows through that transistor having its base at a higher potential than the other transistor. This type of logic circuit is sometimes referred to as emitter-coupled or current-steered logic circuitry.

DESCRIPTION OF THE PRIOR ART

The current switch is the fastest logic circuit known to the art at the present time. The output nodes of the current-switch feed into the respective bases of two emitter-follower circuits which provide the requisite level shifting for connection of the logic circuits in cascade. The outputs of the emitter-followers will vary in potential to the extent that the base-to-emitter junctions of the emitter-followers vary in potential due to changes of temperature. Heretofore, these base-to-emitter voltage variations had to be taken into account in designing the circuitry and resulted in limited noise tolerances and temperature ranges.

SUMMARY OF THE INVENTION

It is therefore a primary object of the present invention to provide a current-switch emitter-follower having circuitry which compensates for the base-to-emitter voltage variations due to temperature and fabrication variables.

Another advantage of the present invention arises in the elimination of any need for decoupling capacitors in the power supply.

Other advantages of the present invention are either inherent in the structure disclosed herein or will become apparent to those skilled in the art as the detailed description proceeds in connection with the accompanying drawing.

BRIEF DESCRIPTION OF THE DRAWING

The drawing shows a schematic circuit diagram of the current-switch emitter-follower together with the compensating circuit.

DESCRIPTION OF THE PREFERRED EMBODIMENT

Referring to the drawing in more detail, the current-switch is indicated generally by the designation CS and comprises a pair of transistors T1 and T2 having their respective emitters E1 and E2 connected to the upper end of emitter-resistor $R_E$. The lower end of the latter is connected to a negative voltage source indicated at V−. The respective collectors C1 and C2 of transistors T1, T2 are connected to the load resistors RC1 and RC2. The upper ends of the latter are connected to a voltage regulator indicated generally by the designation VR.

The voltage regulator VR comprises a pair of transistors T3, T4. The base B3 of transistor T3 is connected by a lead L to the collector C4 of transistor T4. Collector C4 is also connected by a load resistor R4 to a voltage source V+. The output of the voltage regulator is indicated at O and is connected to the upper end of load resistors RC1, RC2 of the current-switch CS. The emitter E3 of transistor T3 is connected to the voltage supply output O, as is also the base B4 of transistor T4. The collector C4 of transistor T4 is connected through load resistor R4 to the voltage source V+, which is also connected to the collector C3 of transistor T3.

The respective outputs O1, O2 of transistors T1, T2 of the current-switch CS are connected to emitter-followers EF1 and EF2 respectively. Emitter-follower EF1 comprises a transistor T6 having a base B6 to which is connected the output line O1, and similarly, the base B5 of transistor T5 of emitter-follower EF2 is connected to the collector of transistor T2 by output lead O2. The respective collectors C5 and C6 of transistors T5 and T6 are connected to voltage source V+, and the emitters E5, E6 of transistors T5, T6 are connected to respective output load resistors RL5, RL6 having their opposite ends connected to a voltage source $V_{TH}$. The in-phase output IO is taken off at the emitter E5 and the out-of-phase output OO is taken off at the emitter E6.

$V_{IN}$ is the input to the current-switch at the base B1 of transistor T1. The base B2 of transistor T2 is biased by the voltage divider comprising resistors R6, R7.

OPERATION OF THE PREFERRED EMBODIMENT

The operation of the current-switch CS is well known and will be described summarily. The current supplied by the voltage regulator VR passes through either transistor T1 or T2, depending on which transistor has a higher potential at its base. That is, if the potential at $V_{IN}$ is higher than that of base B2 of transistor T2, then transistor T1 will be "on" whereas transistor T2 will be "off" and all the current will flow through transistor T1. If the potential at the base B2 of transistor T2 is higher than that at the base B1 of transistor T1, then in a similar manner T2 will be "on" and transistor T1 will be "off." The flow of current through either load resistor RC1 or RC2 provides a respective voltage drop at either the collector C1 or the collector C2 and thereby provides the output signals on the output leads O1, O2. The potentials at the latter are lowered to the proper level by emitter-followers EF1 and EF2.

If the base-to-emitter voltage of emitter-followers EF1, EF2 varies due to temperature change, the base-to-emitter voltage of transistor T4 varies by substantially the same amount so as to compensate for the variation in emitter-followers EF1, EF2. To assure accurate tracking of the variations in EF1, EF2 the latter are preferably formed on the same chip as transistor T4, thereby compensating for manufacturing variations as well as temperature changes.

It is to be understood that the particular embodiment shown in the drawings and described above is merely illustrative of one of the many forms which the invention may take in practice and that numerous modifications thereof will readily occur to those skilled in the art without departing from the scope of the invention as delineated in the appended claims, and that the claims are to be construed as broadly as permitted by the prior art.

I claim:

1. A monolithic current-switch emitter-follower circuit comprising
   - a unitary integral semiconductor substrate,
   - a current-switch formed in said substrate and comprising at least one transistor having a collector load impedance,
   - a voltage supply formed in said substrate and connected to said collector load impedance,
   - emitter-follower means formed in said substrate and connected to said current-switch, said emitter-follower means including a base-to-emitter junction having a temperature-variable potential $V_{BE}$ thereacross,
   - a reference potential, and
   - temperature-responsive means for maintaining said voltage supply at a potential with respect to said reference potential of substantially said potential $V_{BE}$.

2. A monolithic circuit as recited in claim 1 wherein said voltage supply is regulated.

3. A monolithic circuit as recited in claim 2 wherein
   - said voltage supply comprises a pair of transistors,
   - a first of said transistors having an emitter and a base and the second transistor having a collector and a base,
   - first conductive means connecting said first transistor base to the second transistor collector, and
   - second conductive means connecting said first transistor emitter to said second transistor base.

4. A monolithic circuit as recited in claim 1 wherein said current-switch comprises a second transistor having a collector, load impedance means connecting said last-recited collector to said voltage supply, and means connecting said last-recited collector to said emitter-follower means.

5. A monolithic circuit as recited in claim 1 wherein said current-switch comprises a pair of transistors each having a collector, a pair of load resistors each connected to a respective one of said last-recited collectors and to said voltage supply, said emitter-follower means comprising a pair of transistors each connected to a respective one of said last-recited collectors and having a base-emitter junction with said potential $V_{BE}$ thereacross.

6. A current-switch emitter-follower circuit comprising a semiconductor substrate, a logic circuit formed in said substrate and having a collector circuit, a voltage supply formed in said substrate and connected to said collector circuit, emitter-follower means formed in said substrate and connected to cascade to said logic circuit, said emitter-follower means including a base-to-emitter junction having a potential $V_{BE}$ thereacross, said voltage supply being at a potential substantially equal to said potential $V_{BE}$.

7. A monolithic circuit as recited in claim 6 wherein said voltage supply comprises a pair of transistors, a first of said transistors having an emitter and a base and the second transistor having a collector and a base, first conductive means connecting said first transistor base to the second transistor collector, and second conductive means connecting said first transistor emitter to said second transistor base.

8. A monolithic circuit as recited in claim 6 wherein said logic circuit comprises a current-switch having two transistors at least one having a collector, load resistor means connecting said last-recited collector to said voltage supply, and means connecting said last-recited collector to said emitter-follower means.

9. A monolithic circuit as recited in claim 6 wherein said logic circuit comprises a current-switch including a pair of transistors each having a collector, a pair of load resistors each connected to a respective one of said last-recited collectors and to said voltage supply, said emitter follower means comprising a pair of transistors each connected to a respective one of said last-recited collectors and having a base-emitter junction with said potential $V_{BE}$ thereacross.

10. A current-switch emitter-follower circuit comprising a current-switch having a collector load impedance, a voltage supply connected to said collector load impedance, emitter-follower means connected to said current-switch, said emitter-follower means including a base-to-emitter junction having a temperature varying potential $V_{BE}$ thereacross, and temperature-responsive means for varying the potential of said voltage supply so as to track variations in said potential $V_{BE}$.

11. A circuit as recited in claim 10 wherein said voltage supply comprises a pair of transistors, a first of of said transistors having an emitter and a base and the second transistor having a collector and a base, first conductive means connecting said first transistor base to the second transistor collector, and second conductive means connecting said first transistor emitter to said second transistor base.

12. A monolithic circuit as recited in claim 11 wherein said current-switch comprises two transistors at least one having a collector, load resistor means connecting said last-recited collector to said voltage supply, and means connecting said last-recited collector to said emitter follower.

13. A monolithic circuit as recited in claim 11 wherein said current-switch comprises a pair of transistors each having a collector, a pair of load resistors each connected to a respective one of said last-recited collectors and to said voltage supply, said emitter follower means comprising a pair of transistors each connected to a respective one of said last-recited collectors and having a base-emitter junction with said potential $V_{BE}$ thereacross.

* * * * *